United States Patent [19]
Kohlschmidt

[11] Patent Number: 6,029,061
[45] Date of Patent: Feb. 22, 2000

[54] POWER SAVING SCHEME FOR A DIGITAL WIRELESS COMMUNICATIONS TERMINAL

[75] Inventor: Peter Kohlschmidt, Erding, Germany

[73] Assignee: Lucent Technologies Inc., Murray Hill, N.J.

[21] Appl. No.: 08/816,013

[22] Filed: Mar. 11, 1997

[51] Int. Cl.$^7$ ....................................................... H04B 1/16
[52] U.S. Cl. ........................ 455/343; 455/38.3; 455/574; 370/311; 375/354; 327/144; 327/151
[58] Field of Search ...................................... 455/502, 343, 455/38.3, 574, 208, 255, 257, 258, 259, 260, 265; 331/2, 18, 25, 49; 340/825.44; 370/311, 324; 375/354, 359, 374; 713/400; 395/500, 502, 503; 327/141, 144, 145, 151, 160; 368/156, 157; 326/93, 96

[56] References Cited

U.S. PATENT DOCUMENTS

| | | | |
|---|---|---|---|
| 5,428,820 | 6/1995 | Okada et al. | 455/38.3 |
| 5,737,323 | 4/1998 | Lansdowne | 370/311 |
| 5,845,204 | 12/1998 | Chapman et al. | 455/343 |

FOREIGN PATENT DOCUMENTS

| | | |
|---|---|---|
| 0586256 A2 | 3/1994 | European Pat. Off. . |

OTHER PUBLICATIONS

A Microprocessor–Based Analog Wristwatch Chip with 3 Seconds/Year Accuracy, Didier Lanfranchi, Evert Dijkstra, Daniel Aebischer, Feb. 16, 1994.

*Primary Examiner*—Lee Nguyen
*Attorney, Agent, or Firm*—Gibbons, Del Deo, Dolan, Griffinger & Vecchione

[57] ABSTRACT

According to the present invention, a mobile communications terminal includes a high accuracy clock for providing a timebase in a normal operating mode, a "slow clock" for providing the timebase in a low power mode of operation, and at least one processor coupled to the high accuracy clock and the "slow clock" for controlling the modes of operation. In a preferred embodiment, the mobile communications terminal includes a conversion signal processor (CSP), a digital signal processor (DSP), a communications protocol processor, and a radio frequency (RF) segment. The CSP, which includes a plurality of registers, interfaces with the DSP to execute the timing control functions for the terminal. In the normal operating mode, the timebase is maintained from the high accuracy clock. During inactive periods of terminal operation (e.g., in a paging mode), a sleep mode is enabled wherein the high accuracy clock source is disabled, the DSP, CSP, and communications protocol processor are shut down, and the "slow clock" provides the timebase for the terminal while a sleep counter is decremented for a given sleep interval. Upon expiration of the sleep interval or in response to an intervening external event (e.g., a keypad is depressed), a terminal wake-up is initiated so that the high accuracy clock resumes control of the timebase. Because the high accuracy clock and the "slow clock" are not synchronized, the CSP and DSP calibrate the "slow clock" to the high accuracy clock prior to the terminal entering the sleep mode.

40 Claims, 6 Drawing Sheets

POWER SAVING SCHEME FOR A DIGITAL WIRELESS COMMUNICATIONS TERMINAL

FIELD OF THE INVENTION

The present invention relates generally to the field of wireless communications and more particularly to a power saving scheme that provides low power and high accuracy clocking modes for digital wireless communications terminals.

BACKGROUND OF THE INVENTION

In a typical wireless communications system, timing must be synchronized between a digital wireless communications terminal and a base station. A high accuracy crystal clock source is generally used in the terminal to maintain a timebase (i.e., a timing reference for operating the terminal). In some modes of operation, such as a paging mode when the communications terminal is waiting for incoming calls, the communications terminal ordinarily does not have to perform any tasks for periods of up to several seconds. However, even if the terminal is designed to enter a power saving mode after not receiving an incoming call for a certain period of time, the communications terminal must still be able to receive appropriate timeslot and other service information during the idle time. Therefore, the timebase must still be maintained even while in these standby or power saving modes.

For current complementary metal oxide semiconductor (CMOS) integrated circuits used in communications terminals, power consumption is directly related to clock frequency. As is known to those skilled in the art, the higher frequency, higher accuracy crystals consume more power. Consequently, the high frequency crystal clock sources and the circuits connected to these clock sources dissipate a significant amount of power even during these standby paging modes.

Commnunications terminals used in the Global System for Mobile Communications (GSM), which is a Pan-European standard for digital cellular phone service, are an example of a device that would benefit from the implementation of an effective power saving scheme. In a GSM system, the timebase is generally provided by a 13 MHz crystal clock source. Although the 13 MHz clock provides a highly stable timebase, the excessive power consumption during the paging mode adversely affects the overall system performance by reducing the battery life of the terminals. Generally, most types of communications systems, such as GSM, employ digital signal processors (DSPs) for the real-time processing of signals. These DSP-based systems are particularly demanding of clock and power resources due to the requirements associated with baseband data processing. Consumer audio applications, such as digital answering machines and digital cordless phones, could also benefit from an effective power saving scheme.

Some attempts have been made in the prior art to provide high accuracy clock circuits with a low power mode. One approach is to operate a low frequency, low power clock on a continuous basis as the primary timing source, and to periodically turn on a high frequency, high accuracy clock to tune the less stable clock. However, the low frequency clock, even with periodic tuning, cannot provide a timebase with the level of accuracy required in time division multiple access (TDMA) type systems such as GSM. The additional circuitry for tuning the low power clock also adds unnecessary design and fabrication constraints on the terminal.

Accordingly, there is still a critical need in the art for a power saving clock scheme that provides a low power mode of operation while maintaining a highly accurate timebase.

SUMMARY OF THE INVENTION

These and other aspects of the invention may be obtained generally in a mobile communications terminal that includes a high accuracy clock for providing a timebase in a normal mode of operation, a low power clock (hereinafter referred to as a "slow clock") for providing the timebase in a low power mode of operation, and at least one processor coupled to the high accuracy clock and the slow clock for controlling the modes of operation of the mobile communications terminal.

In one exemplary embodiment, the mobile communications terminal includes a conversion signal processor (CSP) coupled to the high accuracy clock and the slow clock, a digital signal processor (DSP) coupled to the CSP, a communications protocol processor coupled to the CSP, DSP, and high accuracy clock, and a radio frequency (RF) segment coupled to the high accuracy clock and the CSP. The CSP, which includes a plurality of registers, interfaces with the DSP to execute the timing control functions for the terminal.

In the normal mode of operation, the timebase is maintained from the high accuracy clock because frequency stability and accuracy of the timing source are essential. During inactive periods of terminal operation (e.g., in a paging mode), a sleep mode is enabled wherein the high accuracy clock source is disabled, and the DSP, the CSP, and the communications protocol processor are shut down. At this time, the slow clock provides the timebase for the terminal while a sleep counter is decremented for a given sleep interval. Because the sleep counter is decremented by clock cycles from the slow clock, the sleep counter will continue to operate in a low power mode even while all other circuitry is completely shut down.

Upon expiration of the given sleep interval or in response to an intervening external event (e.g., a keypad is depressed), a terminal wake-up is initiated so that the high accuracy clock resumes control of the timebase. Because the high accuracy clock and the slow clock are not synchronized, the CSP and DSP calibrate the slow clock to the high accuracy clock prior to the terminal entering the sleep mode. During the calibration, a timing relationship is calculated by measuring the clock cycles of each clock source for a given calibration time interval. Upon terminal wake-up, the timing relationship is used to adjust the timebase accordingly.

BRIEF DESCRIPTION OF THE DRAWINGS

A more complete understanding of the present invention may be obtained from consideration of the detailed description of the invention in conjunction with the drawings, with like elements referred to with like references, in which.

DETAILED DESCRIPTION OF THE INVENTION

Figure 1:
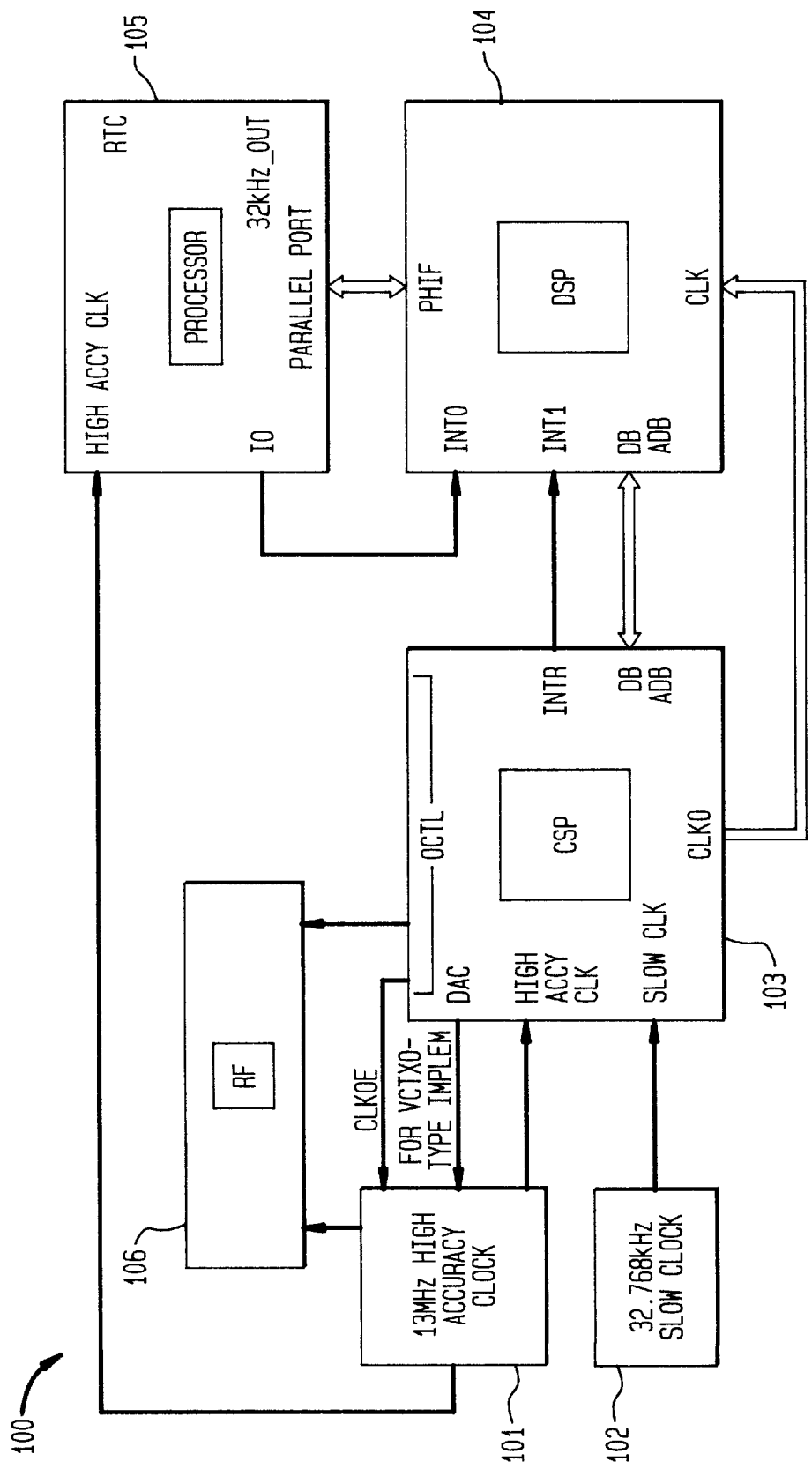
FIG. 1 is a block diagram of an exemplary embodiment of the present invention.

Although the present invention is particularly well suited for digital signal processing (DSP)-based systems, such as digital cellular communications systems, and shall be described with respect to these systems, the power saving scheme disclosed herein can be applied to any number of integrated circuit applications requiring a low power mode of operation.

As discussed below in more detail and in accordance with an embodiment of the invention shown in FIG. 1, a mobile communications terminal 100 includes a high accuracy clock 101 for providing the timebase for the terminal 100 in a first mode of operation (hereinafter referred to as a normal operating mode), and a low power clock 102 (hereinafter referred to as a slow clock 102) for providing the timebase for the terminal 100 in a second mode of operation (hereinafter referred to as a low power mode). The terminal 100 further includes a conversion signal processor (CSP) 103 coupled to the high accuracy clock 101 and the slow clock 102, a digital signal processor (DSP) 104 coupled to the CSP 103, and a communications protocol processor 105 coupled to the DSP 104 and the high accuracy clock 101. A radio frequency (RF) segment 106 is coupled to the high accuracy clock 101 and the CSP 103. The CSP 103, which includes a plurality of registers, interfaces with the DSP 104 to execute the timing control functions for the terminal. In the normal operating mode, the timebase of the terminal is maintained from the high accuracy clock because frequency stability and accuracy of the timing source are essential. During inactive periods of terminal operation (e.g., in a paging mode), a sleep mode is enabled wherein the high accuracy clock source is disabled. At this time, the DSP 104, the CSP 103, and the communications protocol processor 105 are shut down, and the slow clock 102 provides the timebase for the terminal while a counter is decremented for a given sleep interval. Upon expiration of the given sleep interval or in response to an intervening external event (e.g., a keypad is depressed), a terminal wake-up is initiated so that the high accuracy clock 101 resumes control providing the timebase of the terminal. Because the high accuracy clock 101 and the slow clock 102 are not synchronized, the CSP 103 and the DSP 104 calibrate the slow clock 102 to the high accuracy clock 101 prior to the terminal entering the sleep mode. During the calibration, a timing relationship is calculated by measuring the clock cycles of each clock source for a given calibration time interval. Upon terminal wake-up, the timing relationship is used to adjust the timebase accordingly.

In more detail, FIG. 1 shows an exemplary embodiment of the present invention in a GSM terminal application, wherein the high accuracy clock 101 is a 13 MHz crystal and the slow clock 102 is a 32.768 kHz watch crystal (hereinafter referred to as a 32 kHz crystal). It will be apparent to one skilled in the art that other suitable crystal clock sources of different frequencies may be used without departing from the spirit or scope of the present invention, that being a dual-clock architecture using a high accuracy clock and a slow clock. Furthermore, it should be noted that the high accuracy clock 101 can be implemented using different types of crystal oscillator sources. For example, high accuracy clock 101 could be a voltage-controlled crystal oscillator (VCXO), a temperature-controlled crystal oscillator (TCXO), or a voltage and temperature-controlled crystal oscillator (VCTXO). The CSP 103, as is known to those skilled in the art, is a mixed signal integrated circuit typically used for performing timing and control functions as well as analog-to-digital (ADC)/digital-to-analog (DAC) operations. The CSP 103 includes an input signal line from the high accuracy clock 101 and an input signal line from the slow clock 102. Depending on the type of crystal oscillator used for the high accuracy clock 101, the CSP 103 can provide an analog voltage control signal to the high accuracy clock 101 via a digital-to-analog conversion (DAC) output line if required. The CSP 103 also provides a clock output enable/disable signal (CLKOE) to turn the high accuracy clock 101 on and off depending on the mode of operation of the terminal. Outputs from the CSP 103 and the high accuracy clock 101 are provided to the radio frequency (RF) segment 106. Examples of the types of registers implemented in the hardware of the CSP 103 to execute the sleep mode operation are identified in Table 1.

TABLE 1

| Register | Access |
| --- | --- |
| slow_clock_control (SCCTL) | read/write |
| calib_sleepmode_timer (CALSTM) | write only |
| counter (CALSTM) | read only |
| calibration_accu (CALACC) | read only |
| XO_spinup_interval (XOSUPINT) | read/write |
| CSP_counter_reload (CSPCRINT) | read/write |

The SCCTL register contains the control flags which are set according to the desired mode of operation. As such, the SCCTL register contains the following bits for the various modes: the 32 kHz oscillator enable bit (COSCENA); the oscillator bypass/CMOS clock input bit (COSCBYP); the calibration_enable bit (CALENA); the sleepmode_enable bit (SLPENA); and the early wake-up bit (EWAKE). The register operations carried out in the present invention for the sleep mode will be described below in further detail with reference to FIGS. 3–6.

The DSP 104 in FIG. 1 is coupled to the CSP 103 via a data bus/address bus (DB/ADB) signal line, which is used for exchanging data and addressing information relating to the registers of the CSP 103. Specifically, contents in the registers of the CSP 103 are mapped in memory locations of the DSP 104 via the DB/ADB signal line. The CSP 103 and the DSP 104 are further coupled by an interrupt signal line (INTR-INT1), which is used by the CSP 103 to send an interrupt signal to the DSP 104. The interrupt signal is used by the CSP 103 as a handshaking mechanism to inform the DSP 104 that data has been written to one of the registers and is available for mapping to the DSP 104 memory locations. Additionally, the interrupt signal is used to wake up the DSP 104 after the given sleep interval has expired, as will be discussed in further detail. The DSP 104 receives the clock signal from the CSP 103 via a clock signal line (CLK0-CLK). It should be noted that there are many suitable types of digital signal processors which use interrupt signals for low power operations and memory locations for mapping register contents as set forth in the present invention.

The DSP 104 would not normally use the slow clock 102 signal for internal, low power operations in the DSP 104, because digital signal processors generally have their own internal, low power ring oscillator for such purposes. As such, while the terminal is in low power mode, the slow clock 102 is only used to maintain the timebase for the terminal. Those skilled in the art will also understand that the CSP 103 and DSP 104 may be combined on a single silicon die. In such a configuration, the internal, low power ring oscillator of the DSP 104 can be eliminated to conserve space and the slow clock 102 could be used to provide internal clocking during low power operations. Other processor configurations may also be possible without departing from the spirit and scope of the present invention.

The communications protocol processor 105 is coupled to the DSP 104 via a parallel host interface line (PHIF) and an interrupt line (IO-INT0). The communications protocol processor 105 is used for general processing functions within the terminal. In a typical processor configuration, the communications protocol processor 105 would also include its own internal, low power ring oscillator for internal clocking during low power operations. To initiate low power operations, the communications protocol processor 105 informs the DSP 104 to execute the sleep mode and the DSP 104 similarly informs the CSP 103. The necessary register operations are then implemented by the CSP 103 and DSP 104 to disable the high accuracy clock 101 and enter the sleep mode. For a normal terminal wake-up, the communications protocol processor 105 is turned on via an interrupt signal from the DSP 104 using the PHIF parallel interface port or other suitable signaling line depending on the configuration. For an early wake-up, the communications protocol processor 105 would inform the DSP 104 (via the IO-INT0 signal line) that an external event has occurred (i.e., keypad depressed on the terminal 100). The DSP 104 and CSP 103 would then implement the necessary register operations to wake up the terminal 100.

It should be noted that the communications protocol processor 105 in FIG. 1 may be of the type having an embedded real time clock (not shown). In such a configuration, the communications protocol processor 105 interfaces to a 32 kHz clock (not shown) via a real time clock (RTC) signal line. The CSP 103 would then receive the slow clock signal via a 32 kHz output line from the communications protocol processor 105 instead of from the directly connected slow clock 102 (as shown in FIG. 1). All other functions of the mobile communications terminal 100 having this configuration are carried out in the same manner as will be described for the embodiment shown in FIG. 1.

As stated, the power saving scheme of the present invention is implemented through a series of register operations which are executed in the hardware of the CSP 103 in conjunction with the processing functions carried out by the DSP 104. In general, the power saving scheme includes calibrating the slow clock 102 with the high accuracy clock 101 prior to entering the sleep mode, enabling the sleep mode, and waking up the terminal 100 at the end of the sleep period or in response to an external event (e.g., a keypad being depressed on the terminal 100).

Figure 2:
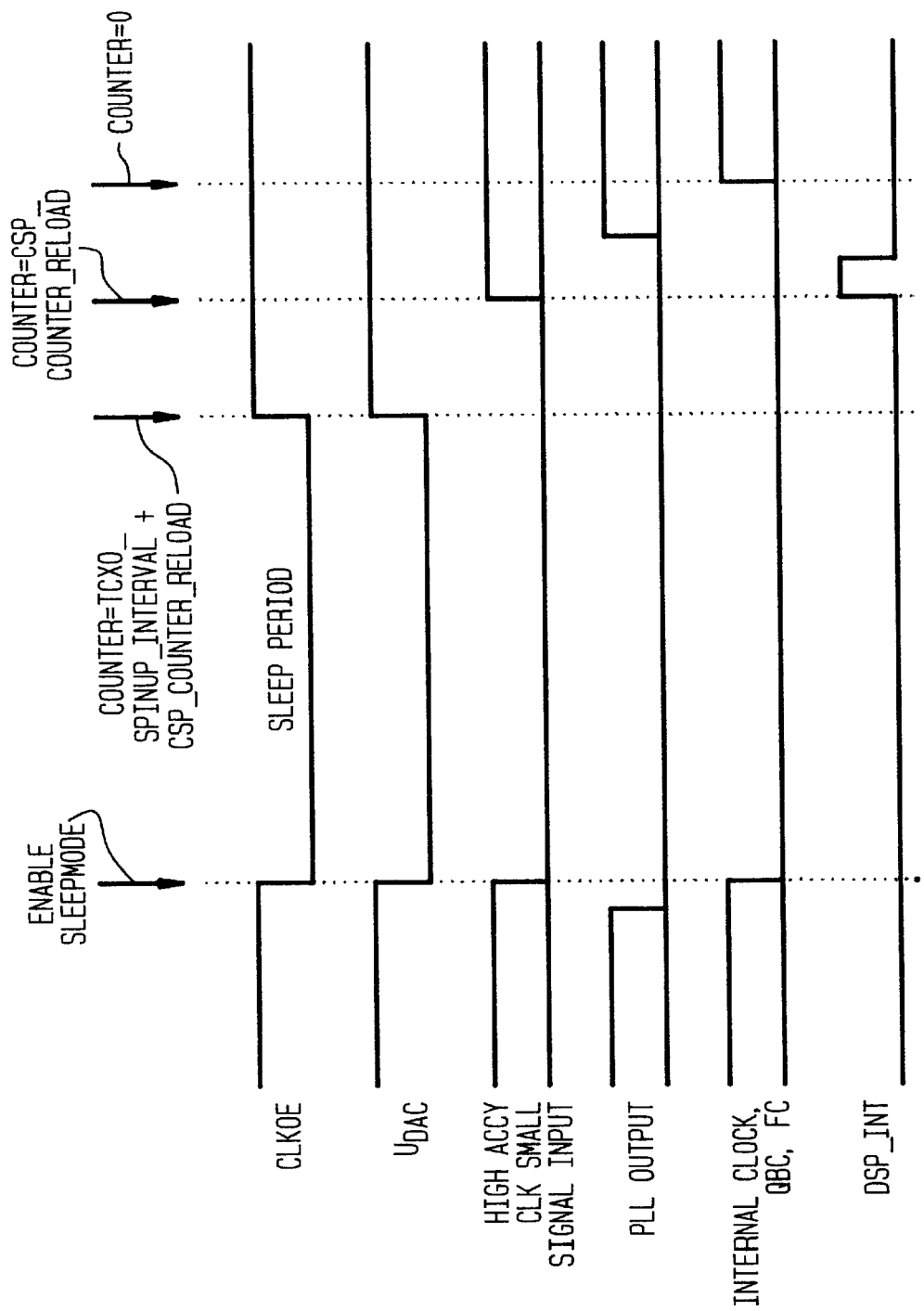
FIG. 2 is a timing diagram illustrative of the sequence of events for the sleep mode of the present invention.

Referring now to the timing diagram in FIG. 2, a sequence of events is shown to illustrate the signaling that occurs prior to, during, and after the sleep period. To facilitate a better understanding of the timing events in FIG. 2, appropriate cross references are included in the discussion provided herein for the applicable components from the terminal 100 shown in FIG. 1. The specific time of occurrence for each of the events is indicated across the top of FIG. 2; however, the details of each event will be addressed in a subsequent detailed discussion of the various register operations. A clock_output_enable (CLKOE) event represents the enable/disable signal being sent from the CSP 103 to the high accuracy clock 101 during the execution of the sleep mode. A $U_{DAC}$ timing event represents the voltage control signal that is converted from digital to analog by the CSP 103 and sent in conjunction with the CLKOE signal from the CSP 103 to the high accuracy clock 101. The $U_{DAC}$ signal is used to provide the necessary control if the high accuracy clock 101 includes, for example, a voltage-controlled crystal oscillator (VCXO). A small signal input timing event represents the high accuracy clock 101 input to the CSP 103. The phase locked loop (PLL) output event represents the enabling/disabling of the PLL output within the CSP 103. PLL's are well known in the art and are typically provided in the CSP 103 to provide a more efficient means for managing a different clock signal in other components of the mobile communications terminal 100. For example, the DSP 104 may require a 26 MHz or 52 MHz clock signal, which can be provided by the PLL in the CSP 103. Clock output from the PLL is provided by the CLK0-CLK signal line between the CSP 103 and the DSP 104. The PLL clock output would be disabled during the sleep period prior to the high accuracy clock 101 being disabled by the CSP 103. An internal clock event represents the clocking internal to the CSP 103 used for carrying out the necessary processing functions within the CSP 103. A quarterbit counter (QBC) and frame counter (FC) are two counters implemented in the hardware of the CSP 103 which provide the timebase for the mobile communications terminal 100 when not in the sleep mode. As such, the QBC and FC are disabled while the terminal 100 is in the sleep mode and operating on the slow clock 102. Quarterbits are used for the timebase in the present invention to provide a greater degree of resolution and precision, which is required in time division multiple access (TDMA) systems, and the like. A DSP_INT event represents the interrupt signal sent from the CSP 103 to the DSP 104 as previously described.

Figure 3:
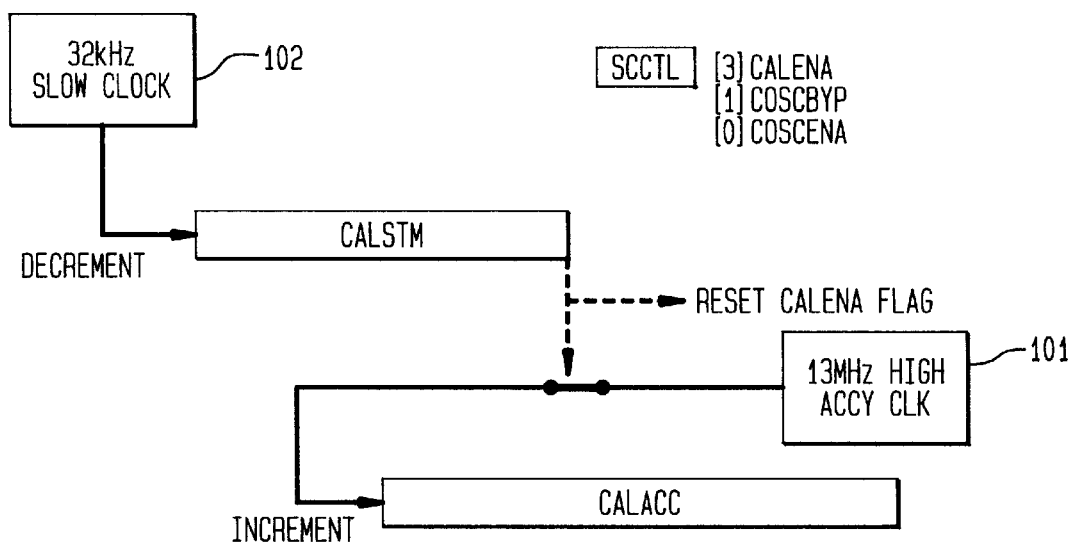
FIGS. 3–6 are flow diagrams of the various register operations carried out in the present invention.

Referring now to FIG. 3, the register operations for carrying out the calibration step are shown. In the discussion of the register operations of FIG. 3 provided herein, appropriate cross references are included for the applicable components from the terminal 100 shown in FIG. 1 to facilitate a better understanding of the calibration operation. Prior to entering the sleep mode, the calib_sleepmode_timer (CALSTM) register in the CSP 103 is set by the DSP 104 with a given value representing the calibration time period which will be used to calibrate the slow clock 102 to the high accuracy clock 101. The DSP 104 then sets the calibration_ enable flag (CALENA) in the slow_clock_control (SCCTL) register in the CSP 103. Once this flag is set to a high condition, the calibration_accumulator register (CALACC) is set with a zero value, and the calibration operation begins with the contents of the CALSTM register being decremented with clock cycles from the slow clock 102 while the CALACC register is incremented by clock cycles from the high accuracy clock 101. Once the given calibration time period expires (i.e., when the CALSTM register decrements to a zero value), the CALENA flag is reset to zero. The path between the high accuracy clock 101 and the CALACC register is opened at the end of the next full clock cycle of the high accuracy clock 101 after the CALSTM register decrements to zero. The remaining value in the CALACC register represents the number of cycles from the high accuracy clock 101 which accumulated for the calibration period that was clocked according to the cycles from the slow clock 102. As such, the DSP 104 reads the contents of the CALACC register to identify a clock relationship factor between the slow clock 102 and the high accuracy clock 101. This factor is used to update the timebase when the terminal 100 enters the wake-up mode from the sleep mode. By way of example in the case of a GSM terminal using 13 MHz and 32 kHz crystal sources, the relationship between the slow clock 102 and the high accuracy clock 101 would be defined as:

$$1QB = \frac{12}{13 \text{ MHz}} = \frac{12*16*(\text{calib\_sleepmode\_timer})}{32 \text{ kHZ}*(\text{calibration\_accu})},$$

where 1QB represents one quarterbit, which is the unit of time typically used for the GSM terminal. Other systems may use other timebase units.

Figure 4:
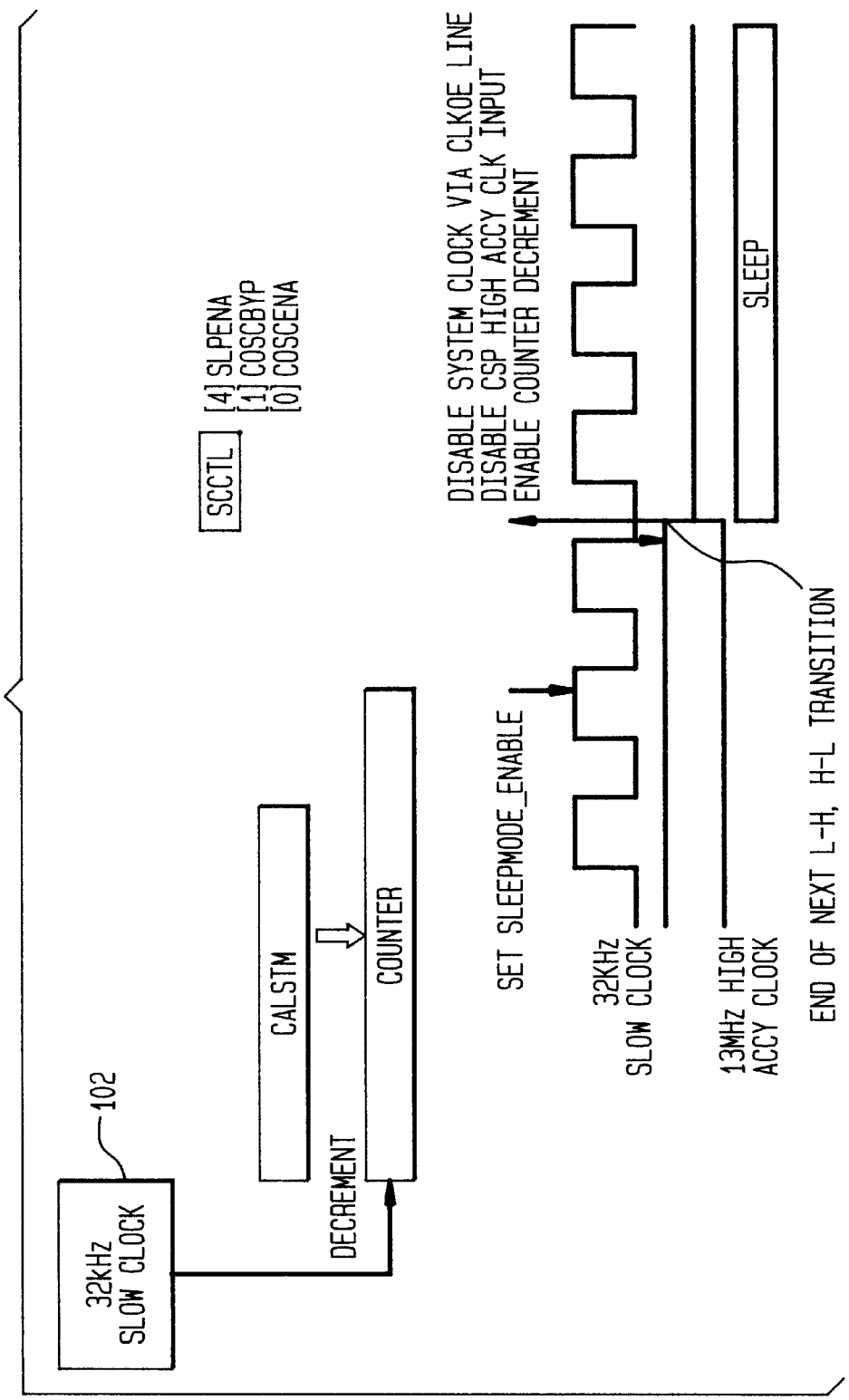

FIG. 4 shows the register operations for enabling the sleep mode. To facilitate a better understanding of the sleep mode operation, appropriate cross references are included in the discussion provided herein for the applicable components from the terminal 100 shown in FIG. 1. Specifically, the calib_sleepmode_timer (CALSTM) register in the CSP 103 is set by the DSP 104 with a given value representing a sleep interval (i.e., how long the terminal 100 will be in sleep mode). Using a communications terminal for the GSM system as an example, the given sleep interval would be set in terms of 488 μsec units. The DSP 104 also sets the XO_spinup_interval (XOSUPINT) register (not shown) with a value which represents the time it will take the high accuracy clock 101 to "spin up" (i.e., the time it takes the crystal oscillator to become stable once being turned back on after being in sleep mode). The DSP 104 also sets the CSP_counter_reload (CSPCRINT) register (not shown) with a value which represents the time it will take the DSP 104 to recalculate and update the timebase upon waking up from the sleep mode. The DSP 104 sets the sleepmode_enable flag (SLPENA) in the slow_clock_control (SCCTL) register to a high state. When the SLPENA flag is set high, the contents from the CALSTM register are then copied into the counter (CALSTM) and the DSP 104 sets to a hardware stop mode (HW_stop_mode). In the hardware stop mode, clock trees in the DSP 104 are disabled and the high accuracy clock 101 can then be disabled by the CSP 103 via the CLK0E signal line. Also, the high accuracy clock input line to the CSP 103 is disabled and the counter (CALSTM) decrement is enabled. By disabling the high accuracy clock input line, the QBC and FC counters in the CSP 103, which provide the timebase for the terminal 100 during normal modes of operation, are effectively disabled and the terminal 100 enters the sleep mode. FIG. 2 shows the timing sequence for each of the above events when the sleepmode_enable flag is set. During the sleep mode, the timebase of the terminal 100 is provided by the slow clock 102 for the duration of the given sleep interval which is decremented by the counter in the CSP 103. Therefore, all components in the mobile communications terminal 100 may be shut down during the sleep mode except for the slow clock 102 and the portion of the CSP 103 containing the counter.

Figure 5:
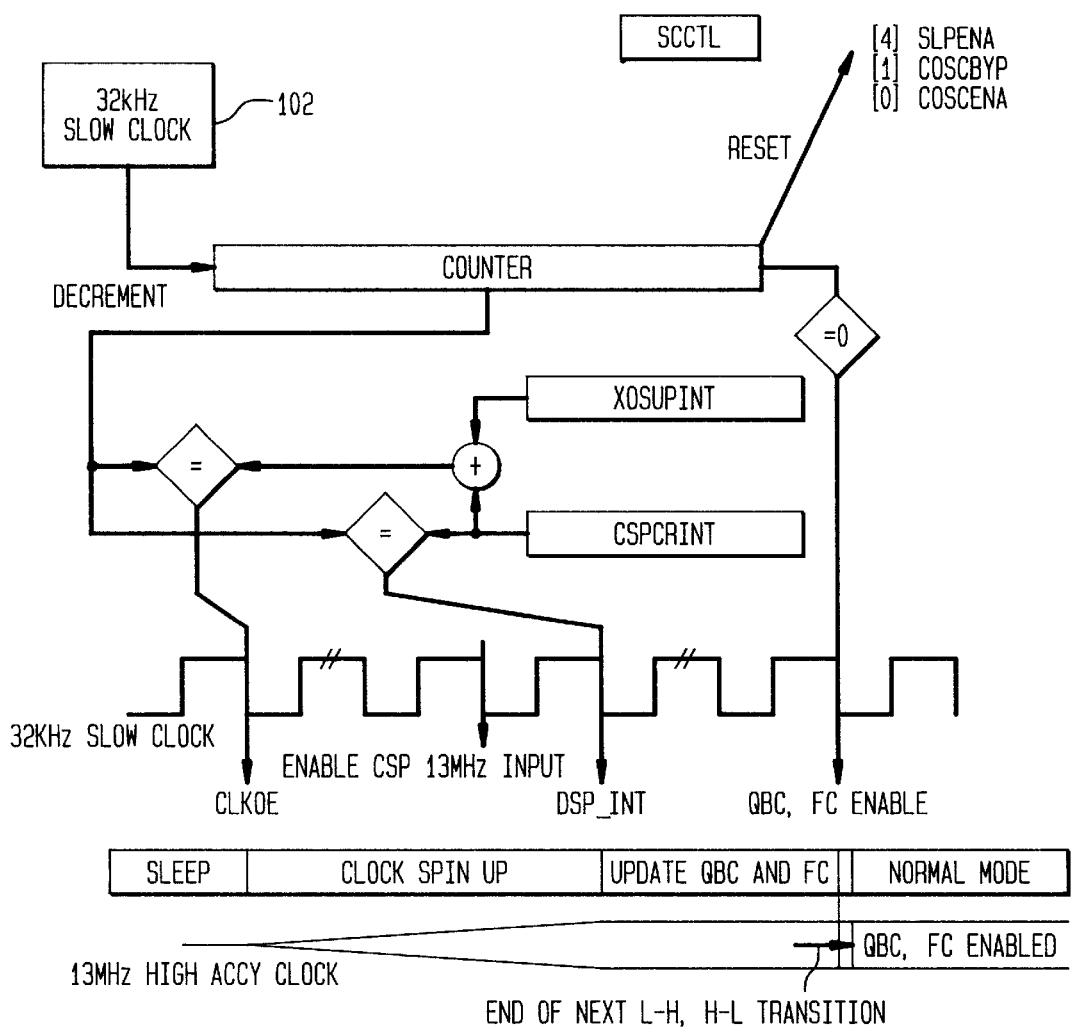

FIG. 5 shows the register operations for executing a normal terminal wake-up when the given sleep interval is fully decremented in the counter (CALSTM). To facilitate a better understanding of the normal wake-up operation, appropriate cross references are included in the discussion provided herein for the applicable components from the terminal 100 shown in FIG. 1. Prior to the counter being decremented to zero, the following events occur. When the contents of the counter register (CALSTM) equals the sum of the contents of the XOSUPINT and CSPCRINT registers, which were previously set by the DSP 104 in the sleep mode enable step, the clock_output_enable signal (CLK0E) (FIGS. 2 and 5) is sent to the high accuracy clock 101 by the CSP 103. The high accuracy clock 101 then "spins up" to reach a stable state. When the contents of the counter register (CALSTM) equal the contents of the CSPCRINT register, the high accuracy clock signal input to the CSP 103 is enabled and the CSP 103 sends an interrupt (DSP_INT) to wake up the DSP 104 (as shown in FIGS. 2 and 5). Upon receiving the DSP_INT signal, the DSP 104 is set to the high accuracy clock 101, which has completed its spinup procedure. During the time after receiving the DSP_INT signal and before the counter decrements to zero, the DSP 104 updates the timebase accordingly. Specifically, the DSP 104 reads the contents of the QBC and FC counters which are mapped into DSP memory locations. The contents of the QBC and FC counters will reflect the values at the time the terminal 100 entered the sleep mode since these counters were disabled at that time. The DSP 104 updates the QBC and FC counters by adding a value representing the time the terminal 100 was in sleep mode (i.e., given sleep interval) to the previous values stored in the QBC and FC counters. The DSP 104 uses the timing relationship between the high accuracy clock 101 and the slow clock 102 as identified in the calibration step (i.e., the CALACC value) in conjunction with the sleep time (i.e., value from the calib_sleepmode_timer (CALSTM register) for the sleep time in the enable sleep mode step). Specifically, the value added to the QBC and FC counters is equal to the sleep time (i.e., value from the CALSTM register) multiplied by the clock relationship factor derived during calibration using the CALACC register. The QBC and FC counters are then rewritten by the DSP 104. When the counter decrements to zero, the sleepmode_enable (SLPENA) flag in the slow_clock_control register (SCCTL) is reset to zero (as shown in FIG. 5) and the QBC and FC counters are enabled (as shown in FIGS. 2 and 5) to provide the timebase for the terminal 100.

Figure 6:
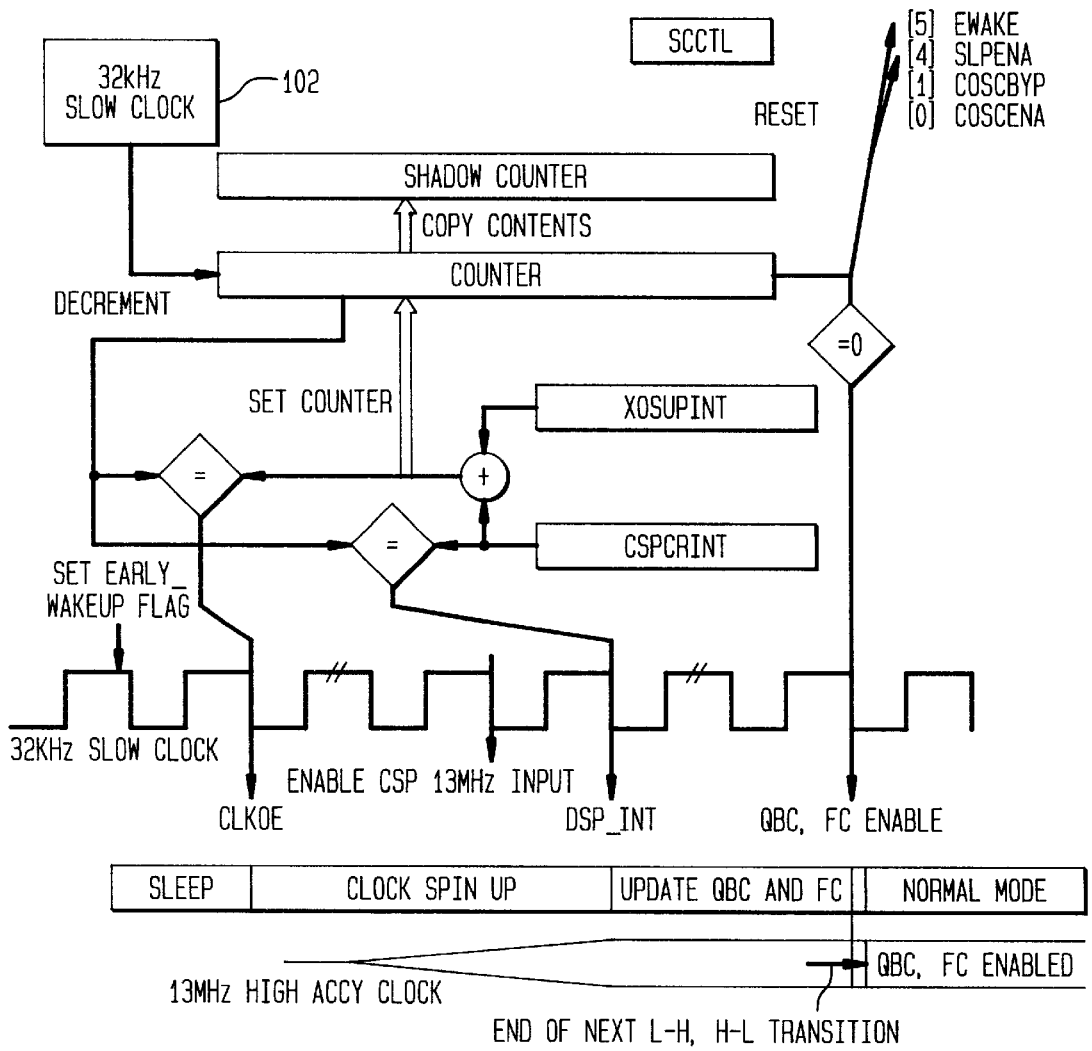

FIG. 6 shows the register operations for executing an early wake-up command in the terminal 100 in response to an external event that occurs prior to the expiration of the given sleep interval. To facilitate a better understanding of the early wake-up operation, appropriate cross references are included in the discussion provided herein for the applicable components from the terminal 100 shown in FIG. 1. An example of such an external event would be when a keypad is depressed on the mobile communications terminal 100. In response to an external event, the DSP 104 sets the early_wakeup flag (EWAKE) to a high state in the slow_clock_control (SCCTL) register in the CSP 103. When EWAKE is set high during the sleep period, the contents of the counter are copied into a shadow counter. The value in the shadow counter therefore represents the actual sleep time for the terminal 100. The counter (CALSTM) is then reset with a value equal to the sum of the XOSUPINT and CSPCRINT registers. The same procedures previously described for the wake-up mode also apply for the early wake-up events with the following exceptions. After receiving the DSP_INT signal, the DSP 104 reads the contents of the shadow counter to obtain the actual sleep time instead of using the given sleep interval that was initially programmed in the CALSTM register. The DSP 104 then updates the timebase (QBC and FC counters) accordingly. Additionally, once the counter decrements to zero, both the sleep_enable (SLPENA) flag and the early_wakeup (EWAKE) flag are reset to zero.

Although the present invention has been described with respect to particular embodiments, those skilled in the art may devise other methods and configurations utilizing the present invention. Accordingly, the present invention should not be limited by the foregoing disclosure, but only by the claims appended hereto.

What is claimed is:

1. A clock circuit comprising:
   at least two asynchronous clock sources, including
      a high accuracy clock source for maintaining a timebase in a first mode, and
      a low power clock source for maintaining the timebase in a second mode for a given time interval; and
   a conversion signal processor having a plurality of registers including an accumulator and a multi-function register, said conversion signal processor coupled to said high accuracy clock source and said low power clock source, said conversion signal processor being operable to calibrate said low power clock source with said high accuracy clock source prior to entering said second mode and to disable said high accuracy clock source during said second mode, said conversion signal processor includes a counter operable to decrement said given time interval according to clock cycles from said low power clock source;

wherein said accumulator is operable to increment according to clock cycles from said high accuracy clock source while said multi-function register is operable to simultaneously decrement a given calibration time period according to clock cycles from said low power clock source.

2. The clock circuit according to claim 1, wherein said high accuracy clock source is a crystal-based clock and said low power clock source is a crystal-based clock having a lower operating frequency relative to said high accuracy clock source.

3. The clock circuit according to claim 1, further comprising a digital signal processor coupled to said conversion signal processor, wherein contents of said plurality of registers are mapped to memory locations in said digital signal processor, said digital signal processor and said conversion signal processor being operable to control timing functions of the clock circuit using said registers.

4. The clock circuit according to claim 3, wherein said digital signal processor is operable to calibrate said low power clock source to said high accuracy clock source using said contents of said accumulator and said multi-function register.

5. The clock circuit according to claim 4, wherein said digital signal processor being operable to identify a timing relationship based on a resulting value in said accumulator.

6. The clock circuit according to claim 5, wherein selected functions in said conversion signal processor, said digital signal processor, and said high accuracy clock source are disabled during said second mode, said given time interval being representative of a sleep interval.

7. The clock circuit according to claim 6, wherein said digital signal processor is responsive to a wake-up signal from said conversion signal processor at the expiration of said sleep interval, said digital signal processor being further operable to update said timebase using said timing relationship and said sleep interval, and said high accuracy clock source being operable to maintain said updated timebase upon said counter being decremented to a zero value.

8. The clock circuit according to claim 6, wherein said digital signal processor is responsive to a wake-up signal from said conversion signal processor prior to the expiration of said sleep interval, said plurality of registers further comprising a shadow counter, said shadow counter cooperating with said counter to store an actual sleep interval, said digital signal processor being further operable to update said timebase using said timing relationship and said actual sleep interval, and said high accuracy clock source being operable to maintain said updated timebase.

9. A cellular communications terminal, comprising:
at least two asynchronous clock sources, including
a high accuracy clock source for maintaining a timebase in a first mode, and
a low power clock source for maintaining the timebase in a second mode for a given time interval;
a conversion signal processor having a plurality of registers including an accumulator and a multi-function register, said conversion signal processor coupled to said high accuracy clock source and said low power clock source, said conversion signal processor being operable to calibrate said low power clock source with said high accuracy clock source prior to entering said second mode and to disable said high accuracy clock source during said second mode, said conversion signal processor includes a counter operable to decrement said given time interval according to clock cycles from said low power clock source; and
a radio frequency segment coupled to said high accuracy clock source and said conversion signal processor;
wherein said accumulator is operable to increment according to clock cycles from said high accuracy clock source while said multi-function register is operable to simultaneously decrement a given calibration time period according to said clock cycles from said low power clock source.

10. The cellular communications terminal according to claim 9, wherein said high accuracy clock source is a crystal-based clock and said low power clock source is a crystal-based clock having a lower operating frequency relative to said high accuracy clock source.

11. The cellular communications terminal according to claim 9, further comprising:
a digital signal processor coupled to said conversion signal processor, wherein contents of said plurality of registers are mapped to memory locations in said digital signal processor, said digital signal processor and said conversion signal processor being operable to control timing functions of the clock circuit using said registers; and
a communications processor coupled to said digital signal processor and to said high accuracy clock source, said communications processor being operable to perform general processing functions of the terminal.

12. The cellular communications terminal according to claim 11, wherein said digital signal processor is operable to calibrate said low power clock source to said high accuracy clock source using said contents of said accumulator and said multi-function register.

13. The cellular communications terminal according to claim 12, wherein said digital signal processor being operable to identify a timing relationship based on a resulting value in said accumulator.

14. The cellular communications terminal according to claim 9, wherein selected functions in said conversion signal processor, said digital signal processor, said communications processor, said radio frequency segment, and said high accuracy clock source are disabled during said second mode, said given time interval being representative of a sleep interval.

15. The cellular communications terminal according to claim 14, wherein said digital signal processor is responsive to a wake-up signal from said conversion signal processor at the expiration of said sleep interval, said digital signal processor being further operable to update said timebase using said timing relationship and said sleep interval, and said high accuracy clock source being operable to maintain said updated timebase upon said counter being decremented to a zero value.

16. The cellular communications terminal according to claim 14, wherein said digital signal processor is responsive to a wake-up signal from said conversion signal processor prior to the expiration of said sleep interval, said plurality of registers further comprising a shadow counter, said shadow counter cooperating with said counter to store an actual sleep interval, said digital signal processor being further operable to update said timebase using said timing relationship and said actual sleep interval, and said high accuracy clock source being operable to maintain said updated timebase.

17. A power saving method, comprising the steps of:
maintaining a timebase in a first mode using a high accuracy clock source;
maintaining the timebase in a second mode for a given time interval using a low power clock source;
calibrating said low power clock source with said high accuracy clock source prior to entering said second mode;
disabling said high accuracy clock source via a programmable processor upon entering said second mode;
decrementing said given time interval according to clock cycles from said low power clock source;
simultaneously incrementing an accumulator according to clock cycles from said high accuracy clock source while decrementing a given calibration time period according to said clock cycles from said low power clock source; and
identifying a timing relationship based on a resulting value in said accumulator.

18. The power saving method according to claim 17, further comprising the step of disabling selected functions of said programmable processor during said second mode, wherein said given time interval is representative of a sleep interval.

19. The power saving method according to claim 18, further comprising the steps of:
providing a wake-up signal to said programmable processor at the expiration of said sleep interval;
calculating an updated timebase in said programmable processor using said timing relationship and said sleep interval; and
maintaining said updated timebase using said high accuracy clock source at the expiration of said sleep interval.

20. The power saving method according to claim 18, further comprising the steps of:
providing a wake-up signal to said programmable processor prior to the expiration of said sleep interval;
measuring an actual sleep interval based on timing of said wake-up signal being provided to said programmable processor;
calculating an updated timebase in said programmable processor using said timing relationship and said actual sleep interval; and
maintaining said updated timebase using said high accuracy clock source at the expiration of said actual sleep interval.

21. A method of operating a cellular communications terminal, comprising the steps of:
maintaining a timebase in a first mode using a high accuracy clock source;
maintaining the timebase in a second mode for a given time interval using a low power clock source;
calibrating said low power clock source with said high accuracy clock source prior to entering said second mode;
disabling said high accuracy clock source via a conversion signal processor upon entering said second mode;
decrementing said given time interval according to clock cycles from said low power clock source;
simultaneously incrementing an accumulator in said conversion signal processor according to clock cycles from said high accuracy clock source while decrementing a given calibration time period according to said clock cycles from said low power clock source; and
identifying a timing relationship using a digital signal processor based on a resulting value in said accumulator.

22. The method according to claim 21, further comprising the step of disabling selected functions of said conversion signal processor and said digital signal processor during said second mode, wherein said given time interval is representative of a sleep interval.

23. The method according to claim 22, further comprising the steps of:
providing a wake-up signal to said digital signal processor at the expiration of said sleep interval;
calculating an updated timebase in said digital signal processor using said timing relationship and said sleep interval; and
maintaining said updated timebase using said high accuracy clock source at the expiration of said sleep interval.

24. The method according to claim 22, further comprising the steps of:
providing a wake-up signal to said digital signal processor prior to the expiration of said sleep interval;
measuring an actual sleep interval based on timing of said wake-up signal being provided to said digital signal processor;
calculating an updated timebase in said digital signal processor using said timing relationship and said actual sleep interval; and
maintaining said updated timebase using said high accuracy clock source at the expiration of said actual sleep interval.

25. A clock circuit comprising:
at least two asynchronous clock sources, including
a high accuracy clock source for maintaining a timebase in a first mode, and
a low power clock source for maintaining the timebase in a second mode for a given time interval; and
a digital device having a first register and a second register coupled to said high accuracy clock source and said low power clock source, said digital device being operable to calibrate said low power clock source with said high accuracy clock source prior to entering said second mode, said digital device includes a counter operable to decrement said given time interval according to clock cycles from said low power clock source;
wherein said first register is operable to increment according to clock cycles from said high accuracy clock source while said second register is operable to simultaneously decrement a given calibration time period according to clock cycles from said low power clock source.

26. The clock circuit according to claim 25 further comprising said digital device being operable to disable said high accuracy clock source during said second mode.

27. The clock circuit according to claim 25 wherein said first register is an accumulator.

28. The clock circuit according to claim 25 wherein said second register is a multifunctional register.

29. The clock circuit according to claim 25 wherein said digital device is a conversion signal processor.

30. A cellular communications terminal, comprising:
at least two asynchronous clock sources, including a high accuracy clock source for maintaining a timebase in a first mode, and a low power clock source for maintaining the timebase in a second mode for a given time interval;

a digital device having a first register and a second register, said digital device coupled to said high accuracy clock source and said low power clock source, said digital device being operable to calibrate said low power clock source with said high accuracy clock source prior to entering said second mode and to disable said high accuracy clock source during said second mode, said digital device includes a counter operable to decrement said given time interval according to clock cycles from said low power clock source; and a radio frequency segment coupled to said high accuracy clock source and said digital device;

wherein said first register is operable to increment according to clock cycles from said high accuracy clock source while said second register is operable to simultaneously decrement a given calibration time period according to said clock cycles from said low power clock source.

31. The cellular communication terminal according to claim 30 further comprising said digital device being operable to disable said high accuracy clock source during said second mode.

32. The cellular communications terminal according to claim 30 wherein said first register is an accumulator.

33. The cellular communications terminal according to claim 30 wherein said second register is a multifunctional register.

34. The cellular communications terminal according to claim 30 wherein said digital device is a conversion signal processor.

35. A power saving method comprising the steps of:

maintaining a timebase in a first mode using a high accuracy clock source;

maintaining the timebase in a second mode for a given time interval using a low power clock source;

calibrating said low power clock source with said high accuracy clock source prior to entering said second mode;

decrementing said given time interval according to clock cycles from said low power clock source;

simultaneously incrementing a first register according to clock cycles from said high accuracy clock source while decrementing a given calibration time period according to said clock cycles from said low power clock source; and identifying a timing relationship based on a resulting value in said first register.

36. The power saving method according to claim 35 further comprising the step of disabling said high accuracy clock source upon entering said second mode.

37. The power saving method according to claim 35 wherein said first register is an accumulator.

38. A method of operating a cellular communications terminal, comprising the steps of:

maintaining a timebase in a first mode using a high accuracy clock source;

maintaining the timebase in a second mode for a given time interval using a low power clock source;

calibrating said low power clock source with said high accuracy clock source prior to entering said second mode;

decrementing said given time interval according to clock cycles from said low power clock source;

simultaneously incrementing a first register according to clock cycles from said high accuracy clock source while decrementing a given calibration time period according to said clock cycles from said low power clock source; and identifying a timing relationship based on a resulting value in said first register.

39. The method of operating a cellular communications terminal according to claim 38 further comprising the step of disabling said high accuracy clock source upon entering said second mode.

40. The method of operating a cellular communications terminal according to claim 38 wherein said first register is an accumulator.

* * * * *